United States Patent
Harrington

(10) Patent No.: US 8,918,383 B2
(45) Date of Patent: Dec. 23, 2014

(54) VECTOR SPACE LIGHTWEIGHT DIRECTORY ACCESS PROTOCOL DATA SEARCH

(75) Inventor: Nathan John Harrington, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 12/169,915

(22) Filed: Jul. 9, 2008

(65) Prior Publication Data

US 2010/0010973 A1     Jan. 14, 2010

(51) Int. Cl.
   *G06F 17/30*     (2006.01)
(52) U.S. Cl.
   CPC .... *G06F 17/30681* (2013.01); *G06F 17/30637* (2013.01)
   USPC .......................................... 707/706; 707/751
(58) Field of Classification Search
   CPC ................................................ G06F 17/30637
   See application file for complete search history.

(56) References Cited

U.S. PATENT DOCUMENTS

| | | | |
|---|---|---|---|
| 6,473,755 B2 | 10/2002 | Evans | |
| 6,574,632 B2 * | 6/2003 | Fox et al. | 1/1 |
| 2002/0138470 A1 * | 9/2002 | Zhou | 707/3 |
| 2004/0093321 A1 * | 5/2004 | Roustant et al. | 707/3 |
| 2004/0199389 A1 * | 10/2004 | Geiger | 704/254 |
| 2005/0060138 A1 * | 3/2005 | Wang et al. | 704/1 |
| 2005/0086212 A1 * | 4/2005 | Hughes et al. | 707/3 |
| 2005/0154721 A1 * | 7/2005 | Lecha et al. | 707/3 |
| 2006/0101060 A1 * | 5/2006 | Li et al. | 707/102 |
| 2006/0106769 A1 * | 5/2006 | Gibbs | 707/3 |
| 2006/0224608 A1 * | 10/2006 | Zamir et al. | 707/101 |
| 2007/0055680 A1 * | 3/2007 | Statchuk | 707/100 |
| 2007/0150466 A1 * | 6/2007 | Brave et al. | 707/5 |
| 2007/0162442 A1 * | 7/2007 | Brill et al. | 707/5 |
| 2007/0242071 A1 * | 10/2007 | Harding | 345/469.1 |
| 2008/0005106 A1 * | 1/2008 | Schumacher et al. | 707/6 |
| 2008/0059452 A1 * | 3/2008 | Frank | 707/5 |
| 2008/0082505 A1 * | 4/2008 | Kokubu et al. | 707/3 |

OTHER PUBLICATIONS

Asad Khan; Access Management of Messaging and Voice Synthesis Software;1999; Auburn University; pp. 1-136.*
Ceglowski, "Building a Vector Space Search Engine in Perl", Feb. 19, 2003, pp. 1-8, retrieved Feb. 15, 2008 http://www.perl.com/pub/a/2003/02/19/engine.html?page=1.

* cited by examiner

*Primary Examiner* — Shew-Fen Lin
*Assistant Examiner* — Jermaine Mincey
(74) *Attorney, Agent, or Firm* — Yee & Associates, P.C.; John R. Pivnichny

(57) ABSTRACT

A computer-implemented method, apparatus, and computer program product for performing a search for data. In one embodiment, the process converts each character of the search query into a phonetic variant to form an inflected search query. The process then identifies a set of inflected data fields of a vector space library satisfying the inflected search query. The set of inflected data fields are formed from a set of lightweight directory access protocol data fields of a set of lightweight directory access protocol records. Thereafter, the process generates a search result listing records of the set of records satisfying the search query.

12 Claims, 6 Drawing Sheets

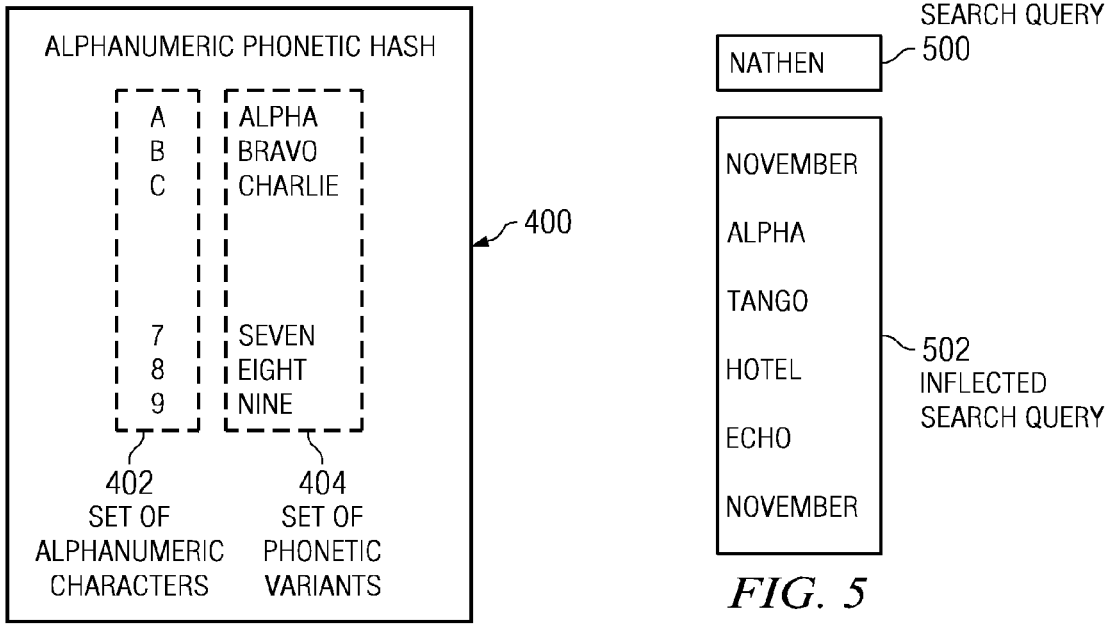
FIG. 4
FIG. 5
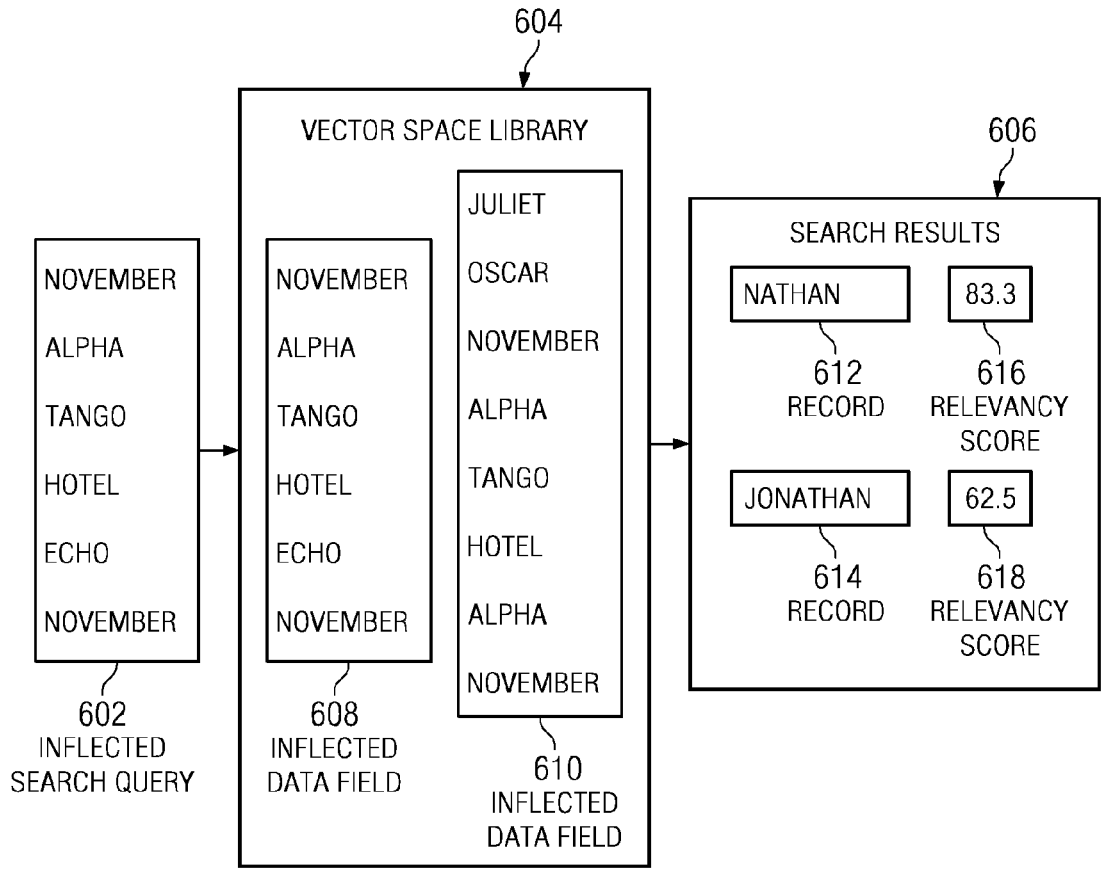
FIG. 6

```
buildInflectString subroutine sub buildInflectString
{
    my $data ="";
    # empty split is for each character in the string
    for my $oneChar ( split //, lc("@_") )
    {
        # skip character if not a-z or 0-9 case insensitive
        next if( $oneChar !~ /([a-z]|[0-9])/i );
        $data .= $phHash{$oneChar} . " ";
    }#for each line in file
    return( $data );
}#buildInflectString
``` vectorSearch.pl main program logic

```
print "Enter a query: \n";
while ( my $query = <STDIN> ) {

$query = buildInflectString( $query );
   my %resHash = ();
   for my $fKey( keys %fileHash )
   {
      my %results = $fileHash{$fKey}->search( $query );

# return top result only from each file
      my ($topRes) = ( sort { $results{$b} <=> $results{$a} } keys %results );
      $resHash{ sprintf("%0.2f", $results{$topRes}) } = $fKey;

}#for each filename my $count = 0;
   foreach my $resultKey ( reverse sort keys %resHash )
   {
      $count++;
      print "Result: $resultKey $resHash{$resultKey}\n";
      last if( $count == $maxMatch );
   }#for each result print "Enter a query: \n";

}#while stdin
```

*FIG. 12*

VECTOR SPACE LIGHTWEIGHT DIRECTORY ACCESS PROTOCOL DATA SEARCH

BACKGROUND OF THE INVENTION

1. Field of the Invention

The disclosure is related generally to a data processing system and in particular to a method and apparatus for searching data. More particularly, the present invention is directed to a computer-implemented method, apparatus, and computer-usable program code for implementing a vector space searching method for locating file names associated with a search query.

2. Description of the Related Art

A lightweight directory access protocol (LDAP) is an application protocol for querying and modifying directory services running over Transmission Control Protocol and the Internet Protocol (TCP/IP). Directory services are implemented by a set of one or more software applications that store and organize information and resources. More specifically, a directory service is a shared information infrastructure for locating, managing, administrating, and organizing common items and network resources. The network resources may include volumes, folders, files, printers, users, groups, devices, telephone numbers, and other objects.

A directory service may provide search capabilities on different attributes associated with objects in a directory. For example, lightweight directory access protocol may permit users to locate network resources without the requirement of remembering the physical address of a network resource. A search for a distinguished name of the resource will suffice to locate the resource. Each resource on the network is considered an object on the directory server. Information about a particular resource is stored as attributes of that object.

SUMMARY OF THE INVENTION

The illustrative embodiments provide a computer-implemented method, apparatus, and computer-usable program code for performing a search for data. In one embodiment, the process converts each character of the search query into a phonetic variant to form an inflected search query. The process then identifies a set of inflected data fields of a vector space library satisfying the inflected search query. The set of inflected data fields are formed from a set of lightweight directory access protocol data fields of a set of lightweight directory access protocol records. Thereafter, the process generates a search result listing records of the set of records satisfying the search query.

BRIEF DESCRIPTION OF THE DRAWINGS

FIG. 4 is a block diagram of an alphanumeric phonetic hash in accordance with an illustrative embodiment;

FIG. 5 is a block diagram showing the generation of an inflected search query in accordance with an illustrative embodiment;

FIG. 6 is a block diagram showing the generation of a search result from an inflected search query in accordance with an illustrative embodiment;

FIG. 12 is an example of software code for query, sorting, and display logic for searching vector space in accordance with an illustrative embodiment.

DETAILED DESCRIPTION OF THE PREFERRED EMBODIMENT

Figure 1:
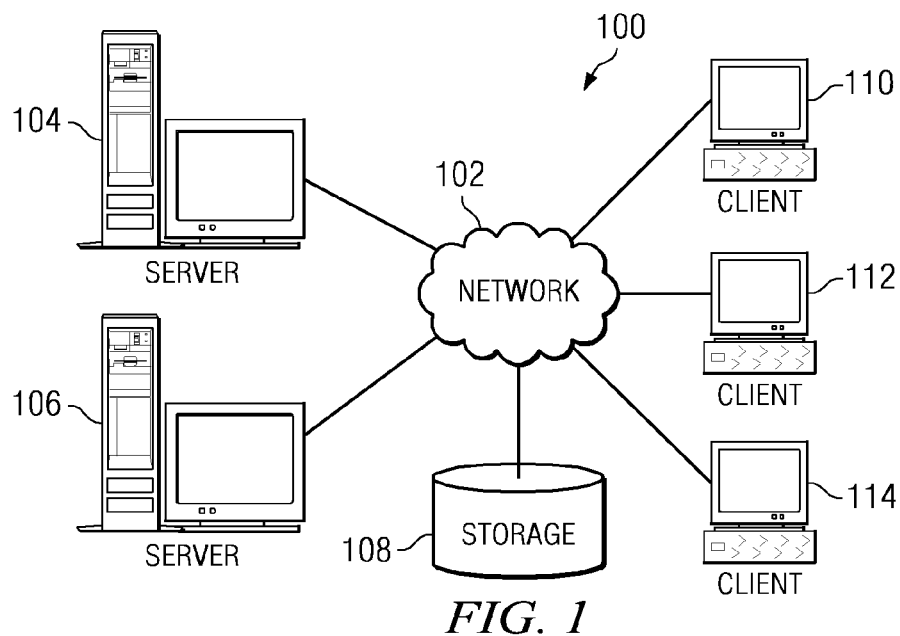
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
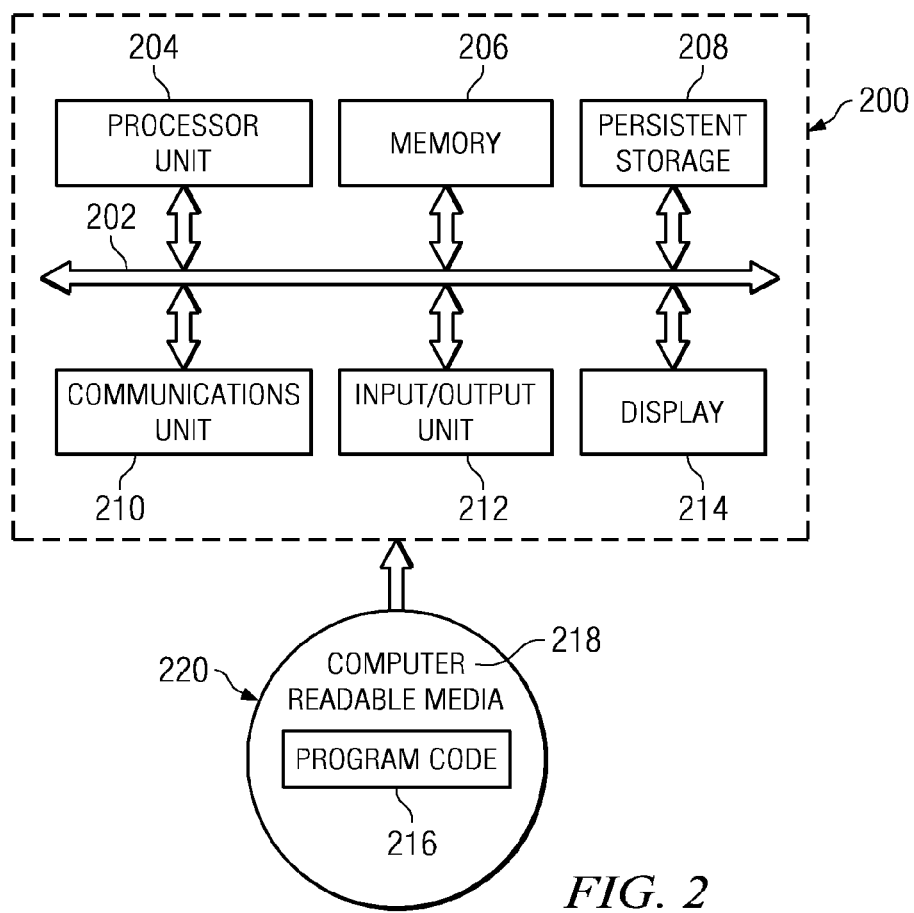
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In an illustrative example, a user may operate a client depicted in FIG. 1, such as client 110, for searching an lightweight directory access protocol database for information. The lightweight directory access protocol database may be stored on client 110, another client computer, or on a server, such as server 104. The search for data may implement vector spaces for compensating for typographical errors. A vector space module, hosted on either a client computer or server computer, such as client 110 or server 104, respectively, may provide the functionality for performing a search using vector spaces.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Known solutions for performing a lightweight directory access protocol data search includes building a regular expression based on stems of a word. In this approach, characters of a search term must be presented in the correct order for providing useful results. For example, a search for the name "Nathen" may fail to generate any results if a lightweight directory access protocol database includes only a record for the name "Nathan." Searching using this method is governed by strict syntax rules that may hinder search efforts, particularly in the instance where the precise spelling of a word is unknown.

Another known solution for performing a lightweight directory access protocol data search involves metaphones and other linguistic derivatives of a search term. A metaphone is a phonetic algorithm for indexing words by their sound, when pronounced in English. The phonetic algorithm produces variable length keys as its output. However, because this searching method assumes the search term is an English language word, this method does not compensate for search terms that may take the form of a serial number.

The illustrative embodiments recognize that the limitations of currently used searching methods require a searching method that accommodates typographical errors and/or search terms that are not English language words. In particular, lightweight directory access protocol data usually includes a set of highly redundant and unique data components. The uniqueness of phone numbers and surnames, for example, may result in ambiguous search results using conventional searching methods. Traditional vector space searching methods treat a word or lightweight directory access protocol data field as a single vector. However, vector space searching as described herein treats each character of a search term as a vector. Consequently, the methods described herein are capable of compensating for typographical errors and inclusion of numbers.

Therefore, the illustrative embodiments provide a computer-implemented method, apparatus, and computer program product for searching data. In one embodiment, the process converts each character of the search query into a phonetic variant to form an inflected search query. The process then identifies a set of inflected data fields of a vector space library satisfying the inflected search query. As used herein, the phrase "set of" means one or more. Thus, a set of inflected data fields may be a single data field or two or more data fields. The set of inflected data fields are formed from a set of lightweight directory access protocol data fields of a set of lightweight directory access protocol records. Thereafter, the process generates a search result listing records of the set of records satisfying the search query.

Figure 3:
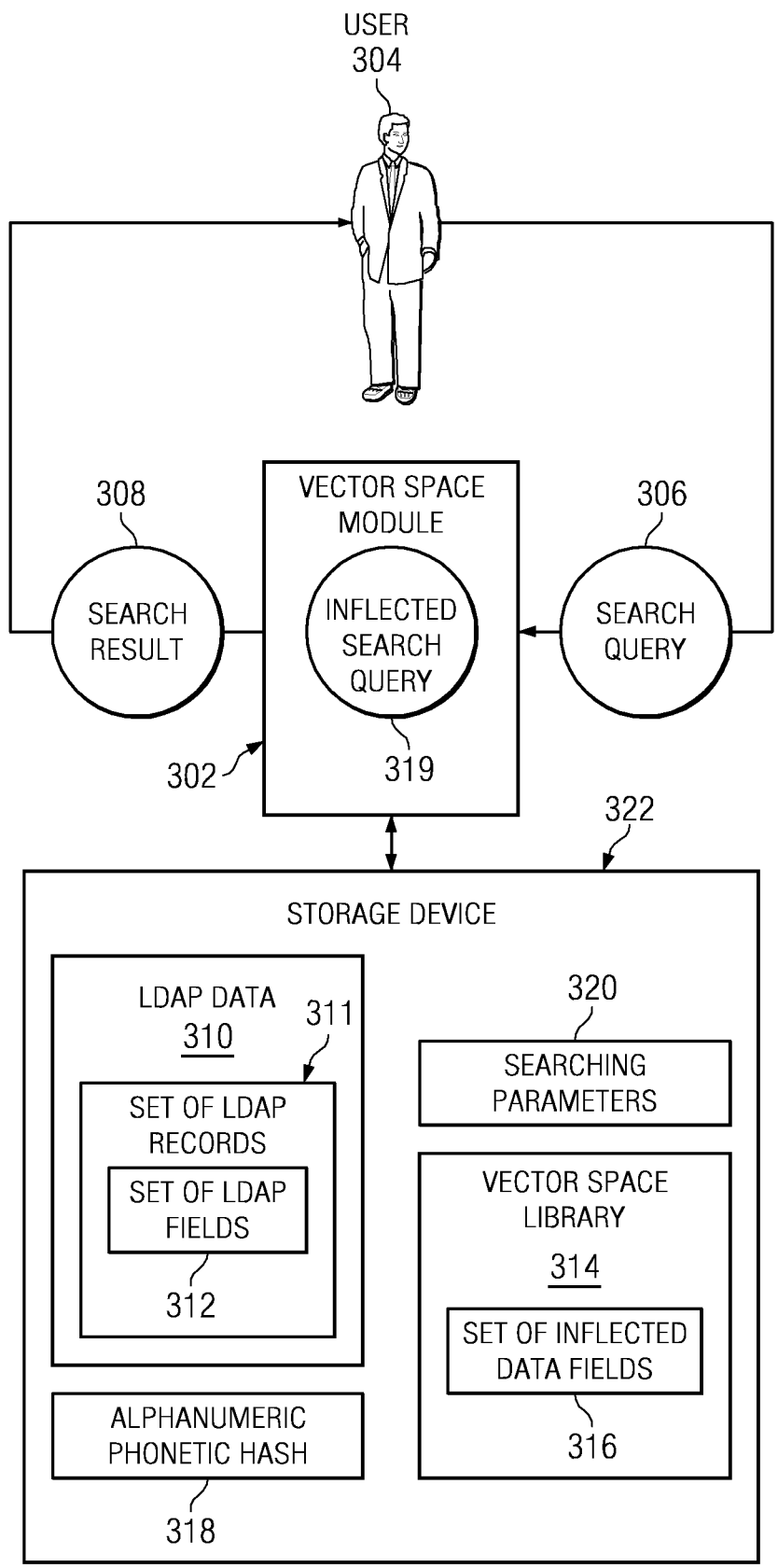
FIG. 3 is a block diagram of a system for using a vector space for locating file names associated with a search query in accordance with an illustrative embodiment.

FIG. 3 is a block diagram of a system for using a vector space for locating file names associated with a search query in accordance with an illustrative embodiment. System 300 is a system such as network data processing system 100 in FIG. 1.

System 300 includes vector space module 302. Vector space module 302 is a software component for facilitating a data search by implementing vector spaces as described herein. Vector space module 302 may be incorporated into or interface with a directory services application. Examples of directory services applications include, for example, Tivoli Directory Service, OpenDS, Oracle Internet Directory, and Apache Directory Server. Tivoli Directory Service is offered by International Business Machines, Inc. OpenDS is an open source directory service released under Sun Microsystems Common Development and Distribution License. Oracle Internet Directory is offered by Oracle Corporation. Apache Directory Server is offered by Apache Software Foundation.

User 304 provides search query 306 to vector space module 302 for locating information. Search query 306 is a query formed from a set of alphanumeric search terms. Search query 306 may include, for example, any combination of letters and numbers. Search query 306 may be generated by a user at a user interface. The user interface may be, for example, a web browser or other type of graphical user interface, a command line interface, or any other type of user interface that enables user 304 to generate search query 306. Search results 308 may also be presented to user 304 at the user interface. Search results 308 is a set of file names or records of lightweight directory access protocol (LDAP) data 310 that satisfy search query 306.

Lightweight directory access protocol data 310 is data managed by a directory service. In addition to directory information, lightweight directory access protocol data 310 may also include, for example, encryption certificates, pointers to printers and other services on a network, or other types of information. Lightweight directory access protocol data 310 may be organized into set of lightweight directory access protocol (LDAP) records 311. Set of lightweight directory access protocol records 311 is one or more data structures storing related information. The information of each record in the set of lightweight directory access protocol records 311 is stored in set of lightweight directory access protocol data fields 312. The set of lightweight directory access protocol data fields 312 is one or more data fields storing lightweight directory access protocol data. For example, set of lightweight directory access protocol records 311 may be a corporate employee directory having one record for each employee. Each employee record includes set of lightweight directory access protocol data fields 312. The set of lightweight directory access protocol data fields 312 may specify fields such as, for example, the employee's name, hiring date, department, skill set, or any other type of information.

Vector space library 314 is a data structure storing set of inflected data fields 316. Set of inflected data fields 316 is one or more inflected data fields. An inflected data field is a vector space. A vector space is a grouping of vectors. The vectors of these vector spaces are generated by converting each character of the alphanumeric string of text, such as the alphanumeric string of text that forms the set of data fields 312, into its phonetic variant. Vector space module 302 is able to perform this conversion by referencing alphanumeric phonetic hash 318.

Alphanumeric phonetic hash 318 is a data structure correlating an alphanumeric character with its phonetic variant. Thus, if set of data fields 312 includes a data field storing the name "Dan," then vector space module 302 may use alphanumeric phonetic hash 318 to generate a corresponding set of inflected data fields 316 including the phonetic variants "Delta," "Alpha," and "November." The phonetic variants form the vectors of each inflected data field of set of inflected data fields 316. Each inflected data field of the set of inflected data fields 316 corresponds to a unique data field of the set of data fields 312. Vector space module 302 may also use alphanumeric phonetic hash 318 for generating inflected search query 319 from search query 306.

Inflected search query 319 is a vector space having a set of vectors that correspond to the individual characters of search query 306. The vectors are created from a set of phonetic variants corresponding to the characters of the search term. For example, if search query 306 is "Nathen," then inflected search query 319 may be "November," "Alpha," "Tango," "Hotel," "Echo," and "November" which correspond to the letters N, A, T, H, E, and N of search query 306.

After vector space library 314 and inflected search query 319 have been created, vector space module 302 compares inflected search query 319 with set of inflected data fields 316 to locate entries from set of inflected data fields 316 that satisfy search query 306. Based upon this comparison, vector space module 302 selects entries from set of inflected data fields 316 for presentation in search results 308. In particular, vector space module 302 selects entries from set of inflected data fields 316 that conform to searching parameters 320. Searching parameters 320 is a set of one or more rules that controls the selection of entries from set of inflected data fields 316 by vector space module 302. Searching parameters 320 may be modifiable by user 304 based upon a desired level of sensitivity. For example, default parameters of searching parameters 320 may allow vector space module 302 to select for presentation entries from set of data fields 312 which have at least fifty percent (50%) of the same vectors as that of inflected search query 319. However, user 304 may modify this threshold to instruct vector space module 302 to return only those entries from set of inflected data fields 316 that have at least eighty percent (80%) of the vectors in inflected search query 319. Thus, a higher threshold requires more matching vectors for inclusion into search results 308. A more detailed description of the operation of searching parameters 320 for controlling the entries of search results 308 is provided in FIG. 5.

In an illustrative embodiment, user 304 generates and sends search query 306 to vector space module 302. Upon receipt of search query 306, vector space module 302 converts search query 306 into inflected search query 319. In addition, vector space module 302 determines whether vector space library 314 has been created. If vector space library 314 has not yet been created, then vector space module 302 converts set of data fields 312 into set of inflected data fields 316. Set of inflected data fields 316 form vector space library 314.

Once vector space module 302 has created vector space library 314, vector space module 302 compares inflected search query 319 with the inflected data fields of vector space library 314 for identifying set of inflected data fields 316. Vector space module 302 uses the results of this comparison for generating search results 308.

Each inflected data field of vector space library corresponds to a data field of set of data fields 312 on a one-to-one basis. In other words, for each entry of set of data fields 312 vector space module 302 generates an entry in vector space library 314. Each inflected data field of vector space library 314 may be linked or otherwise associated with its corresponding entry in set of data fields 312 using any currently existing or later developed method. For example, each inflected data field of vector space library 314 may include a pointer identifying its corresponding entry from set of data fields 312. Such an association permits vector space module 302 to populate search results 308 with file names or other data from lightweight directory access protocol data 310 based upon an identification of set of inflected data fields 316 that satisfy search query 306.

FIG. 4 is a block diagram of an alphanumeric phonetic hash in accordance with an illustrative embodiment. Alphanumeric phonetic hash 400 is an alphanumeric phonetic hash such as alphanumeric phonetic hash 318 in FIG. 3.

Alphanumeric phonetic hash 400 includes set of alphanumeric characters 402. Set of alphanumeric characters 402 are letters and numbers usable for forming alphanumeric strings of text. In addition, alphanumeric phonetic hash 400 includes set of phonetic variants 404. Set of phonetic variants 404 are words, each of which corresponds to a unique character in set of alphanumeric characters 402. A vector space module such as vector space module 302 in FIG. 3 may use alphanumeric phonetic hash 400 to generate vectors from the characters of a string of text in a search query, such as search query 306 in FIG. 3. A vector space module generates vectors in the manner described with respect to FIG. 5.

FIG. 5 is a block diagram showing the generation of an inflected search query in accordance with an illustrative embodiment. Search query 500 is a search query such as search query 306 in FIG. 3. Likewise, inflected search query 502 is an inflected search query such as inflected search query 319 in FIG. 3.

Search query 500 is generated by a user, such as user 304 in FIG. 3. In this illustrative example, search query 502 is an alphanumeric string of characters forming the name "Nathen." Upon receipt by a vector space module such as vector space module 302 in FIG. 3, search query 500 is converted into inflected search query 502. The vector space module may use an alphanumeric phonetic hash, such as alphanumeric phonetic hash 400 in FIG. 4 for converting the characters of the search query "Nathen" into their corresponding vectors. Such a conversion results in a vector space having one phonetic alphabet variant for each character of search query 500. Thus, inflected search query 502 includes the vectors "November," "Alpha," "Tango," "Hotel," "Echo," and "November" which correspond to the letters N, A, T, H, E, and N of search query 500. The vectors of inflected search query 502 may then be compared with a set of inflected data fields of a vector space library for performing a search for the information requested by the user. The set of inflected data fields may be set of inflected data fields 316 in FIG. 3.

FIG. 6 is a block diagram showing the generation of a search result from an inflected search query in accordance with an illustrative embodiment. Inflected search query 602 is an inflected search query such as inflected search query 500 in FIG. 5. Vector space library 604 is a vector space library such as vector space library 314 in FIG. 3. In addition, search result 606 is a search result such as search result 308 in FIG. 3.

A vector space module, such as vector space module 302 in FIG. 3 compares inflected search query 602 with the inflected data fields of vector space library 604. This comparison allows the vector space module to identify a set of inflected data fields of vector space library 604 that comport with search parameters. The search parameters are search parameters such as searching parameters 320 in FIG. 3.

In this illustrative example in FIG. 6, the search parameters may have instructed the vector space module to identify the inflected data fields that match at least eighty percent of the vectors of inflected search query 602. Inflected search query 602 includes vectors "November," "Alpha," "Tango," "Hotel," "Echo," and "November." The vectors of inflected search query 602 are formed from a search query for the name "Nathen."

A comparison of inflected search query 602 with the inflected data fields of vector space library 604 results in the identification of inflected data fields 608 and 610 as satisfying the specified searching parameters. The searching parameters may have instructed the vector space module to identify those inflected data fields having at least eighty percent of the vectors included in inflected search query 602.

Inflected data field 610 includes the vectors "Juliet," "Oscar," "November," "Alpha," "Tango," "Hotel," "Alpha," and "November." The vectors of inflected data field 610 correspond to a data field for the name "Jonathan." Inflected data field 608 includes the vectors "November," "Alpha," "Tango," "Hotel," "Alpha," and "November." The vectors of vector space entry 608 correspond to a data field for the name "Nathan." Thus, because both inflected data fields 608 and 610 include five of the six vectors of inflected search query 602 ("November," "Alpha," "Tango," "Hotel," and "November") inflected data fields 608 and 610 include approximately eighty three percent (83%) of the vectors of inflected search query 602, inflected data fields 608 and 610 satisfy the specified search parameters. As a result, the vector space module may generate search result 606 to include results corresponding to inflected data fields 608 and 610.

The vector space module may sort the results of search result 606 according to a relevancy score assigned to each record of search result 606. In this illustrative example in FIG. 6, record 612 is assigned to relevancy score 616, which has value of 83.3. Record 614 is assigned to relevancy score 618, which has a value of 62.5. In one embodiment, relevancy scores may be determined by calculating percentage of vectors of an inflected data field that are in common with the vectors of an inflected search query. For example, inflected data field 608 has five vectors in common with inflected search query 602. Because inflected data field has a total of six vectors, the relevance score is approximately eighty three-and-one-third percent (83.3%). Inflected data field 610 also has five vectors in common with inflected search query 602. However, inflected data field 608 has a total of eight vectors. Thus, the relevance score for inflected data field 608 is only sixty two-and-a-half percent (62.5%).

Relevancy scores 616 and 618 are used to weight the records of search result 606. Once the records are weighted, the records of search result 606 may be listed in order of relevance. Based on the relevancy scores, when search result 606 is presented to a user, record 612 is listed first because record 612 corresponds to inflected data field 608, which has a higher relevance score than inflected data field 610. Record 614, which corresponds to inflected data field 610, is listed second.

Figure 7:
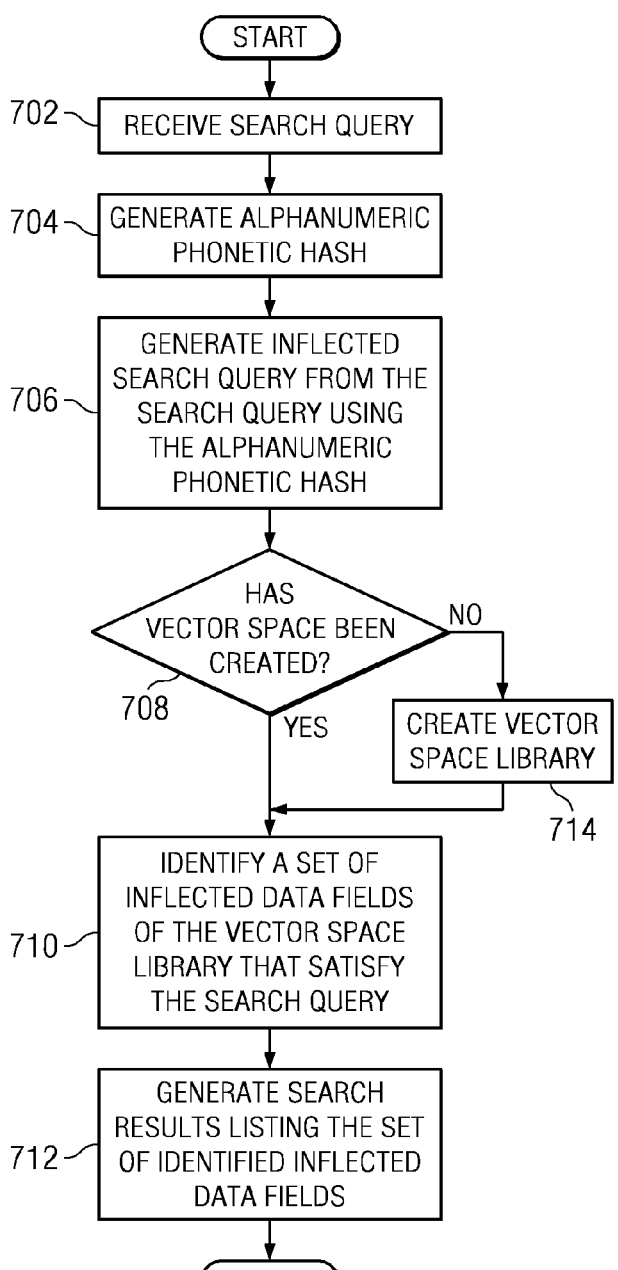
FIG. 7 is a flowchart of a process for implementing a vector space searching method for locating file names associated with a search query in accordance with an illustrative embodiment.

FIG. 7 is a flowchart of a process for implementing a vector space searching method for locating file names associated with a search query in accordance with an illustrative embodiment. The process in FIG. 7 may be implemented by a software component such as vector space module 302 in FIG. 3.

The process begins by receiving a search query (step 702). The search query is a search query such as search query 306 in FIG. 3. The process then generates an alphanumeric phonetic hash (step 704). The alphanumeric phonetic hash is an alphanumeric phonetic hash such as alphanumeric phonetic hash 318 in FIG. 3. The alphanumeric phonetic hash is then used to generate an inflected search query from the search query (step 706).

The process then makes the determination as to whether the vector space library has been created (step 708). The vector space library is a vector space library such as vector space library 314 in FIG. 3. If the process makes the determination that a vector space library has been created, then the process identifies a set of inflected data fields of the vector space library that satisfies the search criteria (step 710). The process then generates the search result listing the set of inflected data fields (step 712) and the process terminates.

Returning now to step 708, if the process makes the determination that a vector space library has not been created, then the process creates the vector space library (step 714) and continues to step 710.

Figure 8:
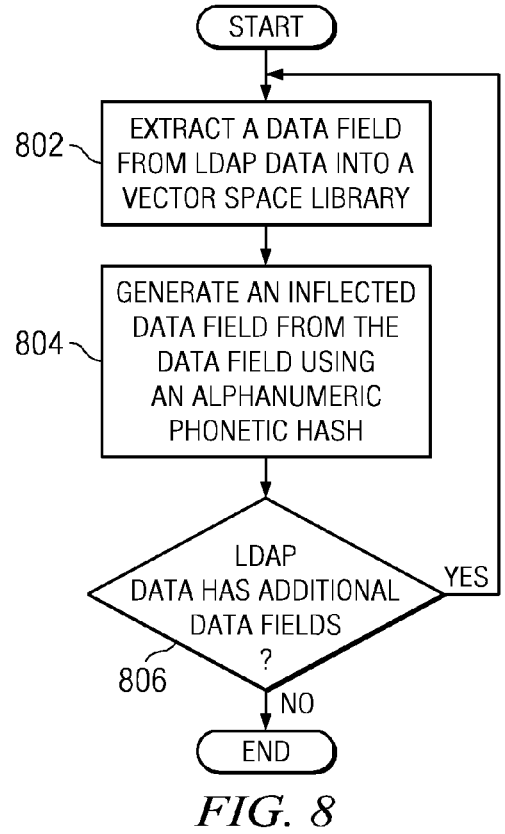
FIG. 8 is a flowchart of a process for creating a vector space library in accordance with an illustrative embodiment.

FIG. 8 is a flowchart of a process for creating a vector space library in accordance with an illustrative embodiment. The process in FIG. 8 may be implemented by a software component such as vector space module 302 in FIG. 3.

The process begins by extracting a data field from lightweight directory access protocol data into a vector space library (step 802). The process then generates an inflected data field from the data field using an alphanumeric phonetic hash (step 804). The process then makes the determination as to whether the lightweight directory access protocol data has additional data fields (step 806).

If the process makes the determination that the lightweight directory access protocol data has additional data fields, then the process returns to step 802. However, if the process makes the determination that the lightweight directory access protocol data does not have additional data fields, then the process terminates.

Figure 9:
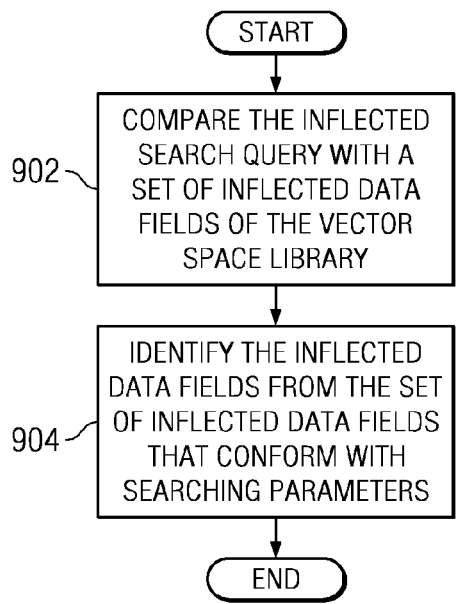
FIG. 9 is a flowchart of a process for identifying a set of inflected data fields of the vector space library that satisfies a search query in accordance with an illustrative embodiment.

FIG. 9 is a flowchart of a process for identifying a set of inflected data fields of the vector space library that satisfies a search query in accordance with an illustrative embodiment. The process may be implemented by a software component such as vector space module 302 in FIG. 3.

The process begins by comparing the inflected search query with a set of inflected data fields of the vector space library (step 902). The process then identifies the inflected data fields from the set of inflected data fields that comports with searching parameters (step 904). The searching parameters are searching parameters such as searching parameters 320 in FIG. 3. The process terminates thereafter.

Figures 10, 11:
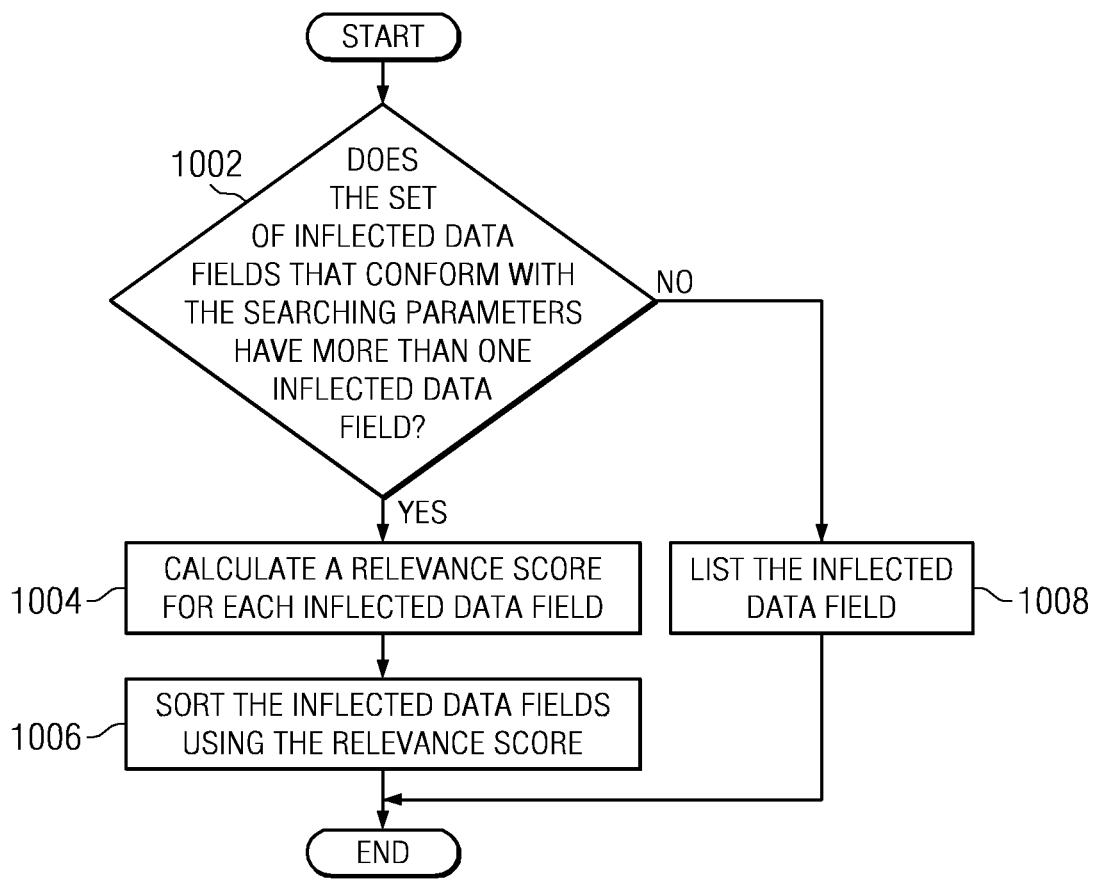
FIG. 10 is a flowchart of a process for generating a search result in accordance with an illustrative embodiment.
FIG. 11 is an example of software code for generating an inflected string for searching vector space in accordance with an illustrative embodiment.

FIG. 10 is a flowchart of a process for generating a search result in accordance with an illustrative embodiment. The process in FIG. 10 may be implemented by a software component such as vector space module 302 in FIG. 3.

The process begins by making the determination as to whether the set of inflected data fields that conforms to the searching parameters has more than one inflected data field (step 1002). If the process makes the determination that the set of inflected data fields that conforms to the searching parameters has more than one inflected data field, then the process calculates a relevance score for each inflected data field (step 1004). The process then sorts the set of inflected data fields using the relevance score (step 1006) and the process terminates.

Returning now to step 1002, if the process makes the determination that the set of inflected data fields that conforms to the searching parameters does not have more than one inflected data field, then the process lists the inflected data field (step 1008) and terminates.

FIG. 11 is an example of software code for generating an inflected string for searching vector space in accordance with an illustrative embodiment.

FIG. 12 is an example of software code for query, sort, and display logic for searching vector space in accordance with an illustrative embodiment.

The illustrative embodiments provide a computer-implemented method, apparatus, and computer program product for searching data. In one embodiment, the process converts each character of the search query into a phonetic variant to form an inflected search query. The process then identifies a set of inflected data fields of a vector space library satisfying the inflected search query. The set of inflected data fields are formed from a set of lightweight directory access protocol data fields of a set of lightweight directory access protocol records. Thereafter, the process generates a search result listing records of the set of records satisfying the search query.

The illustrative embodiments disclosed herein facilitate the searching of data in a manner that compensates for typographical errors. This compensation is achieved by converting the alphanumeric characters of a search term and a set of data fields of target data into phonetic variants. This conversion forms vector spaces where the phonetic variants are the vectors of the vector space. A search may then be performed by comparing the vectors of an inflected search query and the vectors of the inflected data fields. In addition, although the examples depicted herein are directed toward the searching of lightweight directory access protocol data, the vector space searching method described herein may be implemented for searching Web pages, scientific research reports, and other forms of natural language writing and/or free form text.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for searching data, the computer implemented method comprising:

responsive to receiving a search query, converting each alphanumeric character of the search query comprising one or more alphanumeric characters from a set of alphanumeric characters comprising letters ranging from A-Z and numbers ranging from 0-9 into a respective corresponding phonetic variant in a one to one relationship to form an inflected search query using an alphanumeric phonetic hash that includes a mapping of the set of alphanumeric characters, into a corresponding set of phonetic variants, wherein each phonetic variant is represented as a spelled out word that corresponds to a unique character in the set of alphanumeric characters, and wherein the inflected search query is a vector space having a set of vectors wherein each vector corresponds to a respective individual alphanumeric character of the search query;

identifying a set of inflected data fields of a vector space library satisfying the inflected search query, wherein the set of inflected data fields are formed from a set of lightweight directory access protocol data fields of a set of lightweight directory access protocol records, wherein an inflected data field is a vector space comprising a group of vectors;

calculating a relevancy score for the records of the set of lightweight directory access protocol records that satisfies the inflected search query, wherein the relevancy score is calculated as a percentage of vectors of an inflected data field that are in common with the vectors of the inflected search query;

determining whether the relevancy score meets a modifiable predetermined threshold;

calculating search parameters as a percentage of vectors of the inflected search query that are in common with the vectors of the inflected data field; and responsive to the relevancy score meets the modifiable predetermined threshold, generating a search result listing records of the set of lightweight directory access protocol records satisfying the search query and conforming to the searching parameters.

2. The computer implemented method of claim 1, wherein the generating step further comprises:

sorting the records according to the relevancy score, wherein the relevancy score is calculated from a comparison of a first set of phonetic variants of the inflected search query and a second set of phonetic variants of an inflected data field.

3. The computer implemented method of claim 1, further comprising:

generating the vector space library having the set of inflected data fields using the alphanumeric hash, wherein the set of inflected data fields are formed from a set of lightweight directory access protocol data fields.

4. A computer program product for searching data, the computer program product comprising:

a computer readable-type storage medium storing executable instructions;

first program instructions for converting each alphanumeric character of a search query comprising one or more alphanumeric characters from a set of alphanumeric characters comprising letters ranging from A-Z and numbers ranging from 0-9 into a respective corresponding phonetic variant in a one to one relationship to form an inflected search query in response to receiving a search query using an alphanumeric phonetic hash that includes a mapping of the set of alphanumeric characters into a corresponding set of phonetic variants, wherein each phonetic variant is represented as a spelled out word that corresponds to a unique character in the set of alphanumeric characters, and wherein the inflected search query is a vector space having a set of vectors wherein each vector corresponds to a respective individual alphanumeric character of the search query;

second program instructions for identifying a set of inflected data fields of a vector space library satisfying the inflected search query, wherein the set of inflected data fields are formed from a set of lightweight directory access protocol data fields of a set of lightweight directory access protocol records, wherein an inflected data field is a vector space comprising a group of vectors;

third program instructions for calculating a relevancy score for the records of the set of records that satisfies the inflected search query, wherein the relevancy score is calculated as a percentage of vectors of an inflected data field that are in common with the vectors of the inflected search query;

fourth program instructions for determining whether the relevancy score meets a modifiable predetermined threshold;

fifth program instructions for calculating search parameters as a percentage of vectors of the inflected search query that are in common with the vectors of the inflected data field; and sixth program instructions, responsive to the relevancy score meets the modifiable predetermined threshold, for generating a search result listing records of the set of records satisfying the search query and conforming to the searching parameters, wherein the first program instructions, the second program instructions, the third program instructions, the fourth program instructions, the fifth program instructions, and the sixth program instructions are stored on the computer readable-type storage medium.

5. The computer program product of claim 4, further comprising:

seventh program instructions for sorting the records according to the relevancy score, wherein the relevancy score is calculated from a comparison of a first set of phonetic variants of the inflected search query and a second set of phonetic variants of an inflected data field, wherein the seventh program instructions are stored on the computer readable-type storage medium.

6. The computer program product of claim 4, further comprising:

eighth program instructions for generating the vector space library having the set of inflected data fields using an alphanumeric hash, wherein the set of inflected data fields are formed from a set of lightweight directory access protocol data fields, and wherein the eighth program instructions are stored on the computer readable-type storage medium.

7. An apparatus for searching data, the apparatus comprising:

a bus system;

a memory connected to the bus system, wherein the memory includes computer usable program code; and a processing unit connected to the bus system, wherein the processing unit executes the computer usable program code to convert each alphanumeric character of a search query comprising one or more alphanumeric characters from a set of alphanumeric characters comprising letters ranging from A-Z and numbers ranging from 0-9 into a respective corresponding phonetic variant in a one to one relationship to form an inflected search query in response to receiving a search query using an alphanumeric phonetic hash that includes a mapping of the set of alphanumeric characters into a corresponding set of phonetic variants, wherein each phonetic variant is represented as a spelled out word that corresponds to a unique character in the set of alphanumeric characters, and wherein the inflected search query is a vector space having a set of vectors wherein each vector corresponds to a respective individual alphanumeric character of the search query;

identify a set of inflected data fields of a vector space library satisfying the inflected search query, wherein the set of inflected data fields are formed from a set of lightweight directory access protocol data fields of a set of lightweight directory access protocol records, wherein an inflected data field is a vector space comprising a group of vectors;

calculate a relevancy score for the records of the set of records that satisfies the inflected search query, wherein the relevancy score is calculated as a percentage of vectors of an inflected data field that are in common with the vectors of the inflected search query;

determine whether the relevancy score meets a modifiable predetermined threshold;

calculate search parameters as a percentage of vectors of the inflected search query that are in common with the vectors of the inflected data field; and responsive to the relevancy score meets the modifiable predetermined threshold, generate a search result listing records of the set of records satisfying the search query and conforming to the searching parameters.

8. The apparatus of claim 7, wherein the processing unit further executes the computer usable program code to sort the records according to the relevancy score, wherein the relevancy score is calculated from a comparison of a first set of phonetic variants of the inflected search query and a second set of phonetic variants of an inflected data field.

9. The apparatus of claim 7, wherein the processing unit further executes the computer usable program code to generate the vector space library having the set of inflected data fields using the alphanumeric hash, wherein the set of inflected data fields are formed from a set of lightweight directory access protocol data fields.

10. A system for searching data, the system comprising:

a storage device, wherein the storage device stores a vector space library comprising a set of inflected data fields, and wherein the set of inflected data fields are formed from a set of lightweight directory access protocol data fields; and a vector space module, wherein the vector space module converts each alphanumeric character of a search query comprising one or more alphanumeric characters from a set of alphanumeric characters comprising letters ranging from A-Z and numbers ranging from 0-9 into a respective corresponding phonetic variant in a one to one relationship to form an inflected search query in response to receiving a search query-using an alphanumeric phonetic hash that includes a mapping of the set of alphanumeric characters into a set of phonetic variants, wherein each phonetic variant is represented as a spelled out word that corresponds to a unique character in the set of alphanumeric characters, and wherein the inflected search query is a vector space having a set of vectors wherein each vector corresponds to a respective individual alphanumeric character of the search query;

identifies a set of inflected data fields of a vector space library satisfying the inflected search query, wherein the set of inflected data fields are formed from a set of lightweight directory access protocol data fields of a set of lightweight directory access protocol records, wherein an inflected data field is a vector space comprising a group of vectors;

calculates a relevancy score for the records of the set of records that satisfies the inflected search query, wherein the relevancy score is calculated as a percentage of vectors of an inflected data field that are in common with the vectors of the inflected search query;

determines whether the relevancy score meets a modifiable predetermined threshold;

calculates search parameters as a percentage of vectors of the inflected search query that are in common with the vectors of the inflected data field; and responsive to the relevancy score meets the modifiable predetermined threshold generates a search result listing records of the set of records satisfying the search query and conforming to the searching parameters.

11. The system of claim 10, wherein the a vector space module sorts the records according to the relevancy score, wherein the relevancy score is calculated from a comparison of a first set of phonetic variants of the inflected search query and a second set of phonetic variants of an inflected data field.

12. The system of claim 10, wherein the a vector space module generate the vector space library having the set of inflected data fields using the alphanumeric hash, wherein the set of inflected data fields are formed from a set of lightweight directory access protocol data fields.

* * * * *